(12) United States Patent
Breau et al.

(10) Patent No.: US 8,060,604 B1
(45) Date of Patent: Nov. 15, 2011

(54) METHOD AND SYSTEM ENABLING INTERNET PROTOCOL MULTIMEDIA SUBSYSTEM ACCESS FOR NON INTERNET PROTOCOL MULTIMEDIA SUBSYSTEM APPLICATIONS

(75) Inventors: Jeremy R. Breau, Kansas City, MO (US); Jim F. Pearce, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 267 days.

(21) Appl. No.: 12/249,367

(22) Filed: Oct. 10, 2008

(51) Int. Cl.
G06F 15/173 (2006.01)
G06F 15/16 (2006.01)
(52) U.S. Cl. .......................... 709/224; 709/225; 709/228
(58) Field of Classification Search ................... 709/224, 709/225, 228
See application file for complete search history.

(56) References Cited

U.S. PATENT DOCUMENTS

| | | | |
|---|---|---|---|
| 7,003,286 B2 | 2/2006 | Brown et al. | |
| 7,881,338 B2 * | 2/2011 | Damola et al. | 370/466 |
| 2004/0243691 A1 * | 12/2004 | Viavant et al. | 709/220 |
| 2005/0091362 A1 | 4/2005 | Shigeta et al. | |
| 2005/0222885 A1 | 10/2005 | Chen et al. | |
| 2006/0258461 A1 * | 11/2006 | Bekman et al. | 463/42 |
| 2007/0156909 A1 * | 7/2007 | Osborn et al. | 709/227 |
| 2007/0195805 A1 * | 8/2007 | Lindgren | 370/401 |
| 2007/0206613 A1 * | 9/2007 | Silver et al. | 370/401 |
| 2007/0282911 A1 | 12/2007 | Bantukul et al. | |
| 2008/0016100 A1 | 1/2008 | Boni et al. | |
| 2008/0016115 A1 * | 1/2008 | Bahl et al. | 707/104.1 |
| 2008/0120425 A1 * | 5/2008 | Beyer et al. | 709/230 |
| 2008/0123686 A1 * | 5/2008 | Lee et al. | 370/466 |
| 2008/0155110 A1 * | 6/2008 | Morris | 709/230 |
| 2008/0268828 A1 * | 10/2008 | Nagaraja | 455/419 |
| 2009/0016325 A1 * | 1/2009 | Al-Bakri | 370/352 |
| 2009/0070469 A1 * | 3/2009 | Roach et al. | 709/226 |
| 2009/0093237 A1 * | 4/2009 | Levenshteyn et al. | 455/412.1 |
| 2009/0165132 A1 * | 6/2009 | Jain et al. | 726/22 |
| 2009/0168758 A1 * | 7/2009 | Apelqvist et al. | 370/352 |
| 2009/0209250 A1 * | 8/2009 | Huq | 455/425 |
| 2009/0304009 A1 * | 12/2009 | Kolhi et al. | 370/400 |

OTHER PUBLICATIONS

Tatara Systems, "Tatara Systems and picoChip Collaborate on SIP/IMS Femtocell Solution," http:www.tatarasystems.com/contentmgr/showdetails.php/id/506, Mar. 27, 2007.
Tilgen, "Tilgen IMS@Home—White Paper," Oct. 2006.

* cited by examiner

*Primary Examiner* — Hieu Hoang

(57) ABSTRACT

Methods and systems for facilitating communication between IMS and non-IMS applications are introduced. A network agent may serve as a proxy between one or more client devices and an Internet Protocol Multimedia Subsystem (IMS) infrastructure. The network agent may transmit a monitoring program to a client device for execution on the client device. The monitoring program may collect data regarding communication applications executing on the client device, and then transmit this data to the network agent. From the collected data, the network agent preferably selects translation logic with which to translate between messages compatible with the communication applications executing on the client device and standardized communication applications executing in the IMS infrastructure.

15 Claims, 10 Drawing Sheets

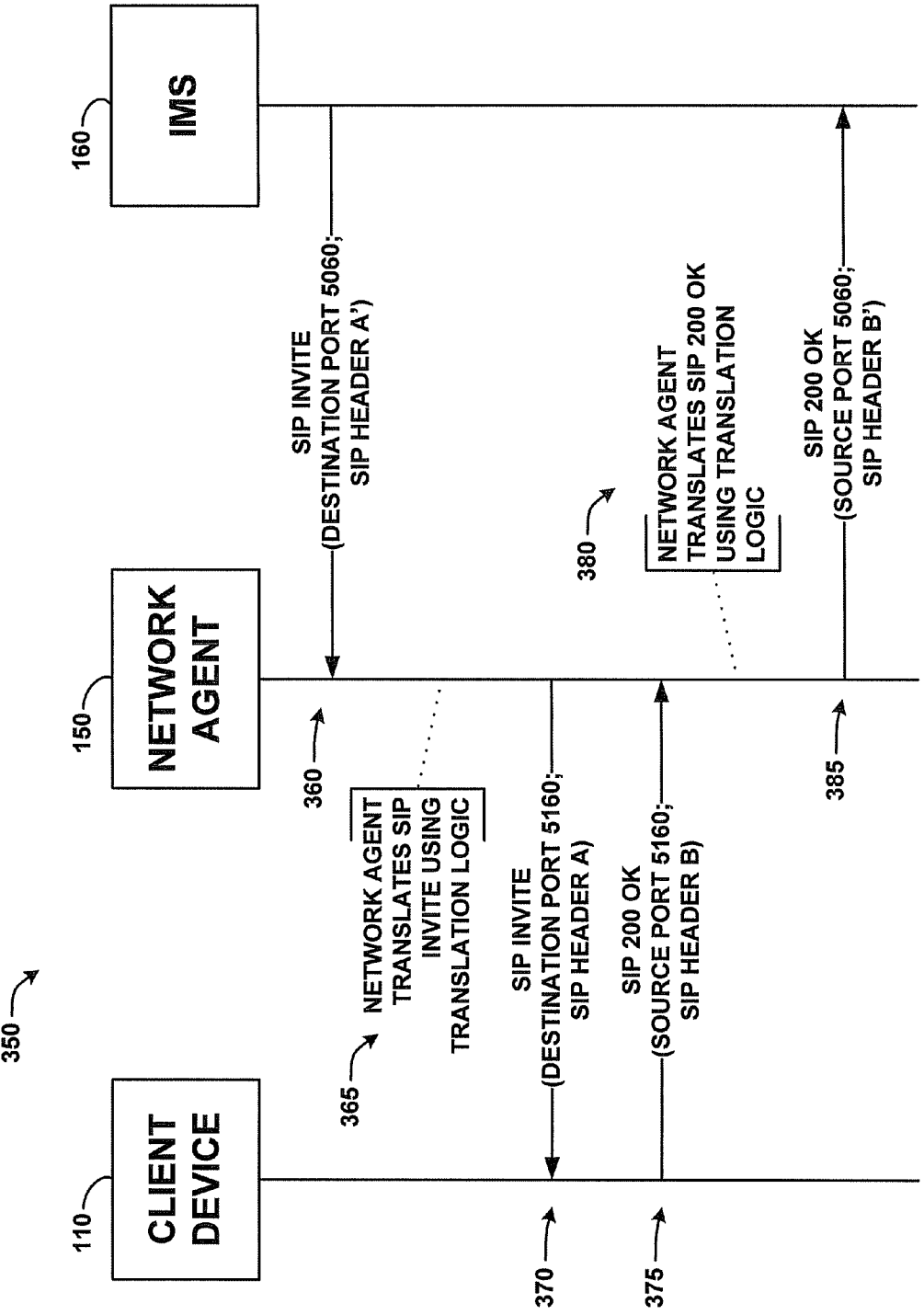

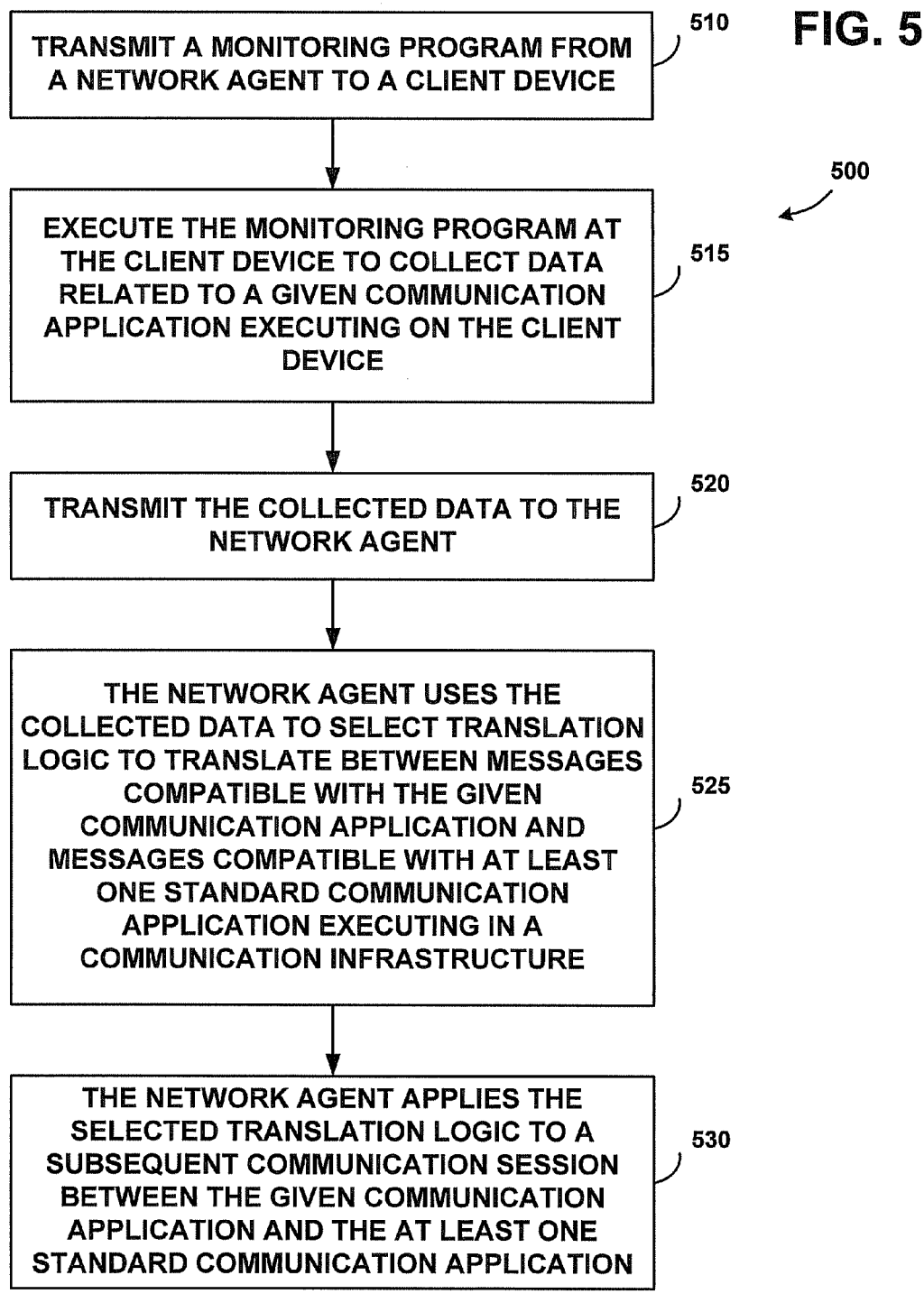

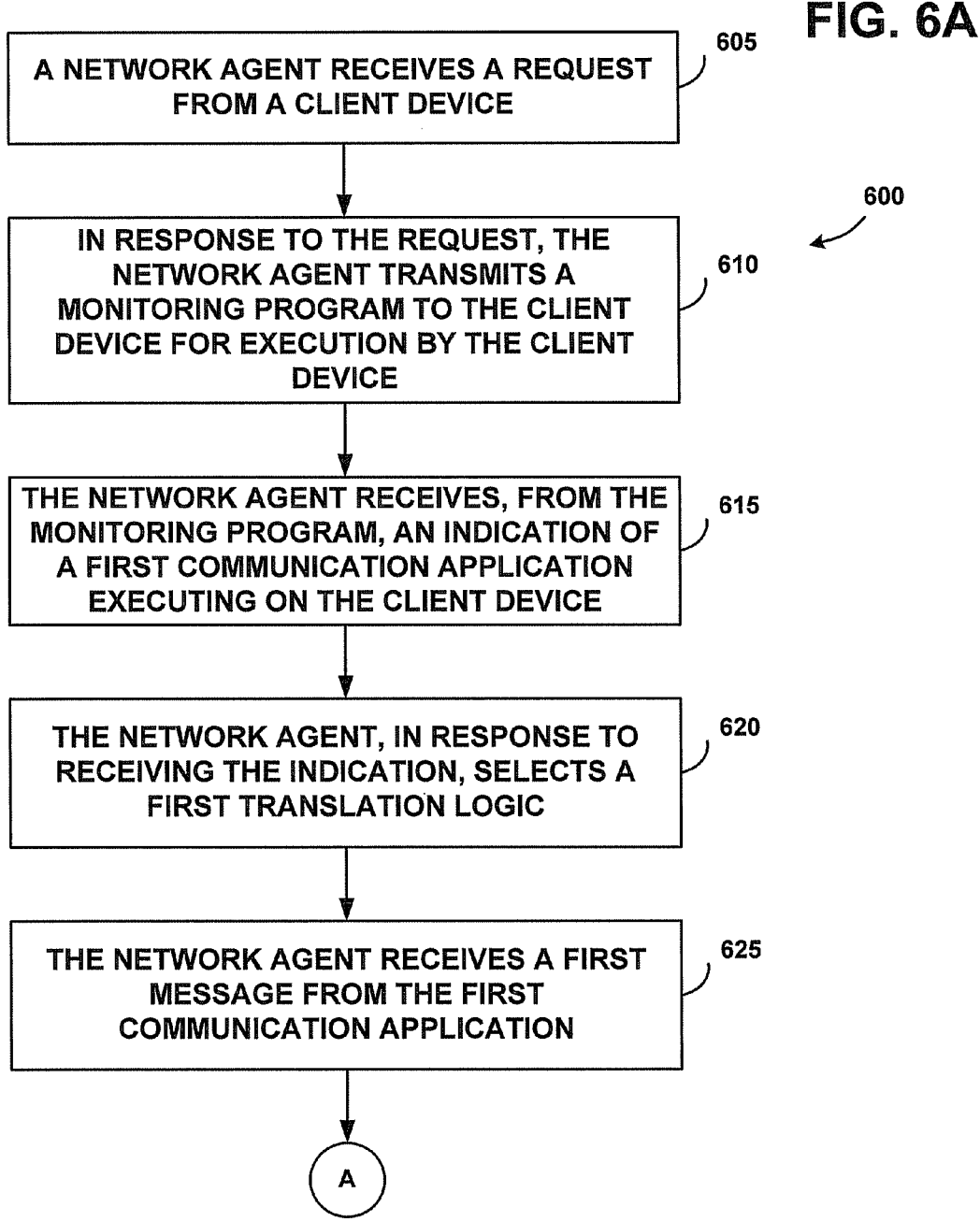

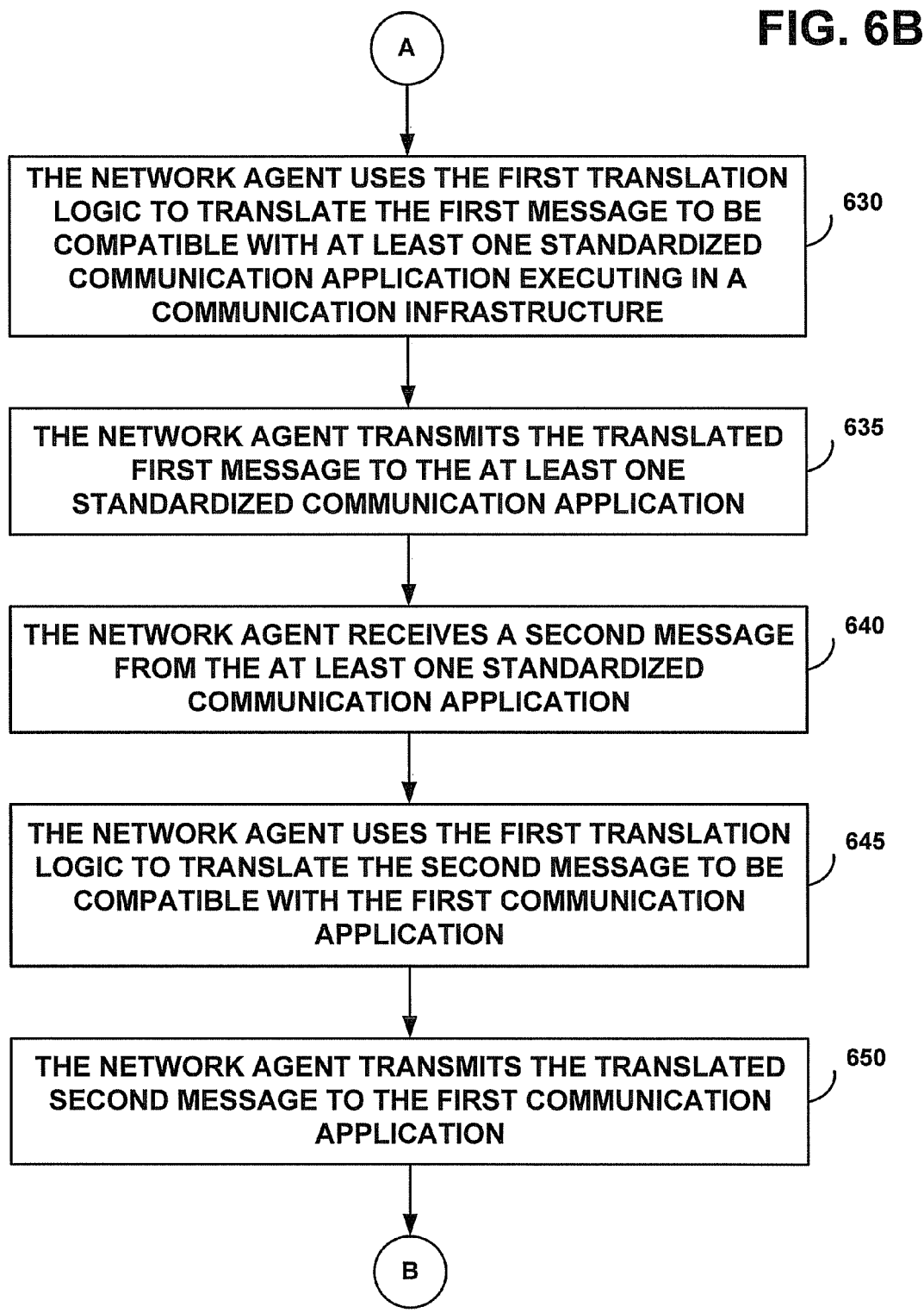

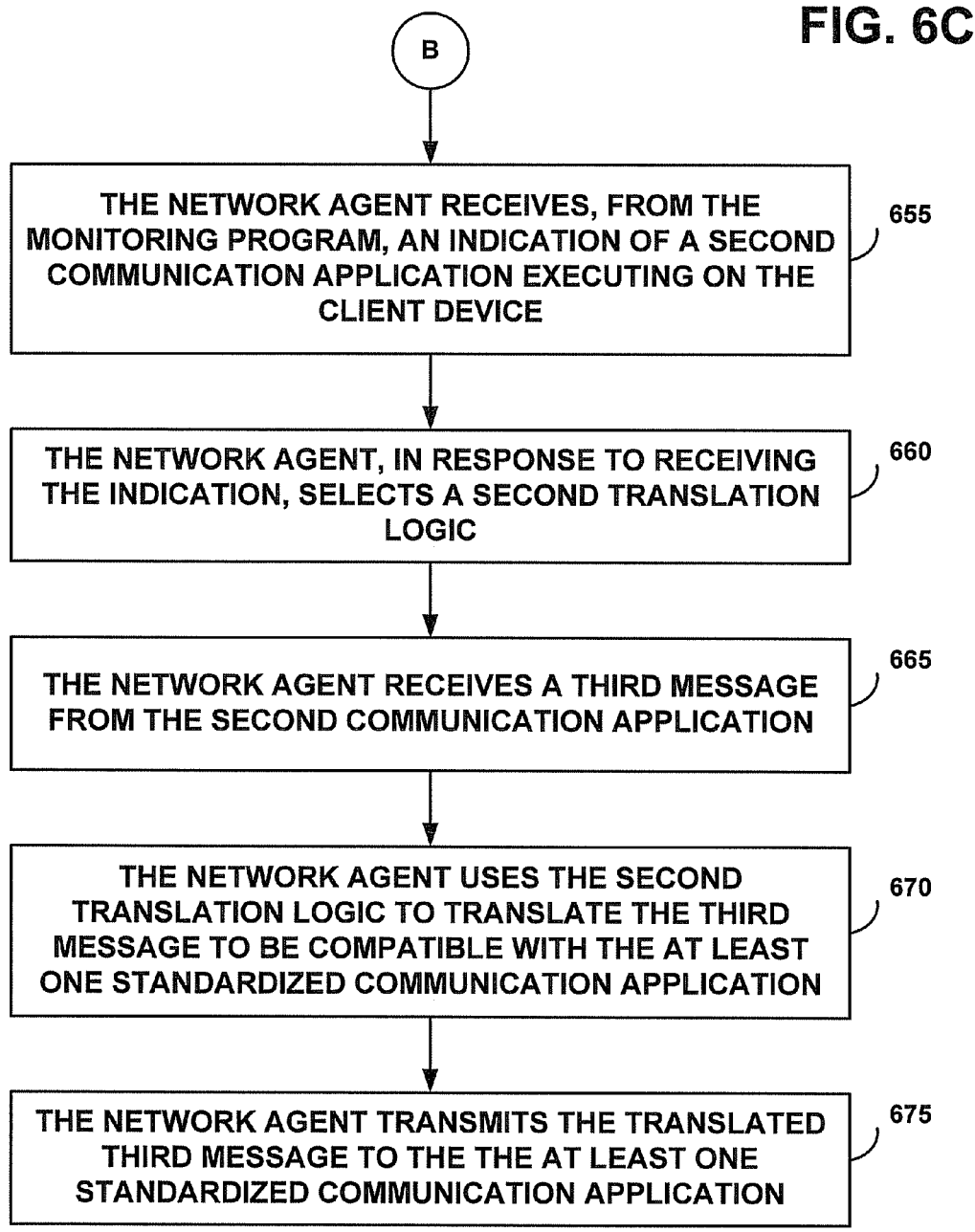

METHOD AND SYSTEM ENABLING INTERNET PROTOCOL MULTIMEDIA SUBSYSTEM ACCESS FOR NON INTERNET PROTOCOL MULTIMEDIA SUBSYSTEM APPLICATIONS

BACKGROUND

The Internet Protocol Multimedia Subsystem (IMS) is an architecture for enabling Internet Protocol (IP) multimedia services for both wireline and wireless devices. The IMS is designed to logically separate access layers from services layers, so client devices can utilize various IMS services regardless of through what means the client device is attached to an IP network. Thus, for example, a wireless communication device (WCD) may be able to access the same voice over IP (VoIP) services from both a code division multiple access (CDMA) wireless wide area network as well as an 802.11 wireless local area network (WLAN). Similarly, the IMS may allow a user of a WCD to be able to make use of the same services from their Digital Subscriber Line (DSL) or cable modem access network.

IMS signaling and call control are largely standardized around the Session Initiation Protocol (SIP), while multimedia bearer traffic typically uses the Real Time Protocol (RTP). The IMS also leverages other protocols developed by the Internet Engineering Task Force (IETF), such as the Session Description Protocol (SDP) and DIAMETER. These common protocols support applications including VoIP, push to talk (PTT), video over IP, gaming, audio and video streaming, and other multimedia services. Additionally, an IMS infrastructure may support instant messaging, presence, email and social networking applications.

Despite the operators of communication networks adopting the IMS architecture in principle, actual IMS deployments have been slow to emerge. This slowness is likely due to many factors, including the IMS protocols and applications still being under development, the overall cost and complexity of IMS deployment, and, perhaps most importantly, the fact that tens of millions of legacy client devices do not support IMS-based protocols.

Given the delays in IMS deployment, non-IMS versions of the services described above have been developed and deployed for various types of client devices. However, these non-IMS applications may not support the same variation of the protocols that are employed by the IMS. Thus, non-IMS applications may be non-compatible with the IMS and therefore unable to leverage the centralized services or advanced services of the IMS.

It may be a number of years before all client devices are shipped with IMS-compatible protocol stacks and IMS-compatible applications. However, operators may want to begin leveraging IMS soon, so that they can offer operator-controlled multimedia services to their subscribers. Thus, it is desirable for there to be a means to allow non-IMS multimedia services executing on client devices to be integrated into an IMS architecture.

OVERVIEW

The following methods and systems for facilitating access to IMS services for non-IMS applications executing on client devices are introduced. In an exemplary embodiment, a network agent is communicatively linked to a client device and a communication infrastructure (such as an IMS infrastructure). The communication infrastructure executes at least one standardized communication application, while the client device is executing a first communication application that is non-compatible with the standardized communication application(s).

In order to register with the communication infrastructure, the client device transmits its credentials to the network agent. Then network agent performs registration of the client device with the communication infrastructure on behalf of the client device. Before, during, or after this registration process, the network agent transmits a monitoring program to the client device.

Upon receiving the monitoring program, the client device preferably executes the monitoring program, and the monitoring program collects data on applications that are running on the client device, such as the first communication application. The monitoring program may collect data related to each application including: the application's name, the application's version, and the transport layer port numbers being used by the application. Depending on the type of the application, the monitoring program may also collect additional data.

In a transaction with the network agent, the monitoring program, still running on the client device, preferably transmits the collected data to the network agent. The network agent uses at least some of this collected data to select a first translation logic. In a subsequent communication session between the first communication application and the standardized communication application(s), the network agent translates messages between these applications using the selected first translation logic. For example, the network agent may translate messages compatible with the first communication application to messages compatible with the standardized communication application(s). The network agent may also translate messages compatible with the standardized communication application(s) to messages compatible with the first communication application.

These messages may be arranged according to variations of SIP, and the translation performed by the network agent may involve translating a variation of SIP used by the first communication application to a variation of SIP used by the standardized communication application(s), and vice versa. This translation may also involve translating source or destination transport layer port numbers in these messages. The first translation logic is preferably based on at least a portion of the data collected by the monitoring program and transmitted to the network agent.

Furthermore, the client device may be executing a second communication application, and the monitoring program may transmit data related to this second communication application to the network agent. Accordingly, the network agent may select a second translation logic so that, in a subsequent communication session between the second communication application and the standardized communication application(s), the network agent translates messages between these applications using the selected second translation logic.

In doing so, the network agent enables, for example, a non-IMS application on a legacy device to communicate with standardized applications and services in an IMS infrastructure.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 3B depicts another call flow in accordance with an exemplary embodiment;

FIG. 5 depicts a method for applying translation logic in accordance with an exemplary embodiment;

FIGS. 6A, 6B, and 6C depicts another method for applying translation logic in accordance with an exemplary embodiment.

DESCRIPTION

Disclosed herein are methods and systems for enabling access to IMS communication applications from client devices executing communication applications that are non-compatible with the IMS communication applications.

I. NETWORK ARCHITECTURE

Figure 1:
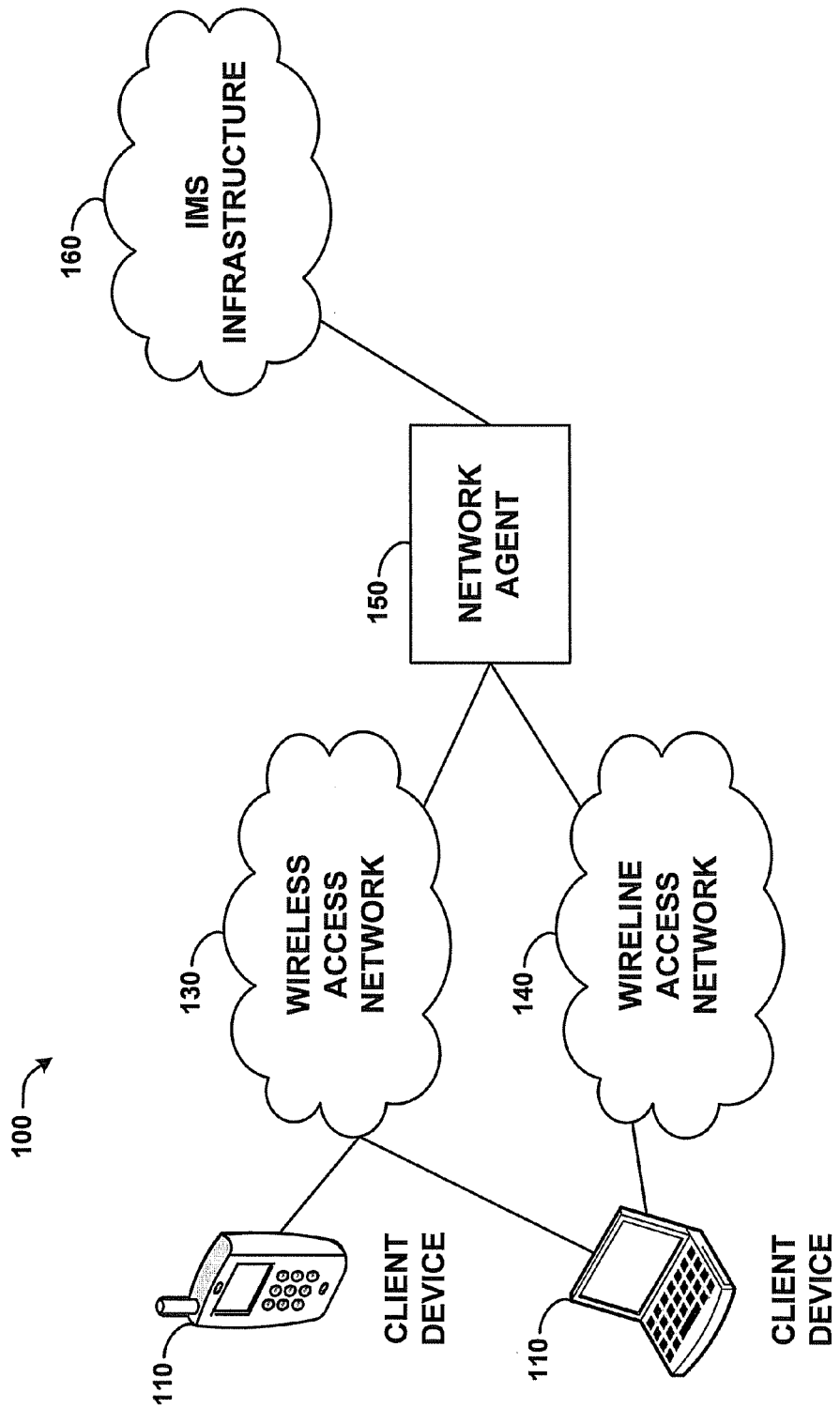
FIG. 1 is a block diagram of a communication network in accordance with an exemplary embodiment.

FIG. 1 is a simplified block diagram of an exemplary communication network 100, in which exemplary embodiments may be employed. Network 100 includes at least one client device 110, wireless access network 130, wireline access network 140, network agent 150 and IMS infrastructure 160. In a deployment of a communication network, more or fewer devices, networks, and infrastructures may be present. For example, tens, hundreds, thousands, or even more client devices 110 may be served by wireless access network 130 and wireline access network 140. Some of these client devices 110 may use wireless access network 130 or wireless access network 140 exclusively, while other client devices 110 may use both wireless access network 130 and wireless access network 140.

The characteristics and functions of each of these elements are described at a high level in the following subsections. However, the descriptions in these subsections are merely introductory and should not be interpreted to limit the characteristics and functions of these elements.

a. Access Networks

Wireless access network 130 may be either a wide area or a local area wireless network, and may be based on technologies such as CDMA, Global System for Mobile communications (GSM), Worldwide Interoperability for Microwave Access (WIMAX) or IEEE 802.11 (Wifi). Wireline network 140 may be based on technologies such as DSL, broadband cable television, Ethernet, Synchronous Optical Networking (SONET), or one or more of the various T-carrier systems. In a deployment, only one of wireless access network 130 and wireless access network 140 may be present, or multiple wireless access networks 130 and/or wireline access networks 140 may be present. Regardless of access network technology, both wireless access network 130 and wireless access network 140 preferably allow client device 110 to be communicatively linked to IMS infrastructure 160.

b. Client Devices

Client device 110 could be a wireless telephone, a wireless personal digital assistant, a wirelessly equipped laptop computer, a wireless router, or another type of mobile or fixed wireless device. Alternatively, client device 110 could be a personal computer, router, server, mainframe computer, computing chassis, or cluster-based computational system. Preferably, a client device 110 is a subscriber device, which is manipulated by a human in order to establish multimedia transactions with the IMS infrastructure 160. However client device 110 could also be an automated device without a human interface.

Client device 110 may execute one or more multimedia applications that are non-compatible with IMS infrastructure 160. These applications may be pre-loaded on client device 110 or downloaded subsequent to the deployment of client device 110. Furthermore, these applications may make use of the same communication protocols as IMS infrastructure 160, but in such a way that the applications are non-compatible with the same, or similar, applications supported by IMS infrastructure 160. For example, applications executing on client device 110 may use a variation of SIP for communication that does not interoperate with the variation of SIP used by IMS infrastructure 160. SIP is defined in Internet Engineering Task Force (IETF) Request for Comments (RFC) 3261, and is incorporated by reference in its entirety herein.

Client device 110 may also be capable of downloading applications from network agent 150 and installing and executing these applications. These applications may take the form of compiled object code, scripts, or byte-compiled intermediate code that executes on a virtual machine of client device 110. Client device 110 may download these applications from a web site via the hypertext transfer protocol (HTTP), hypertext transfer protocol over secure sockets layer (HTTPS), or by some other means. HTTP is defined in IETF RFC 2616 and is incorporated by reference in its entirety herein. HTTPS is defined in IETF RFC 2818 and is also incorporated by reference in its entirety herein.

Client device 110 preferably comprises a central processing unit (CPU), a memory, a network interface for communicating, and input/output functions. The memory preferably contains CPU-executable program instructions encoded to perform the various methods described herein.

c. Network Agent

Network agent 150 is preferably a device or set of devices that facilitates interoperation between IMS applications and applications that are non-compatible with IMS applications. Accordingly, network agent 150 preferably facilitates the registration of client device 110 with IMS infrastructure 160, and in particular, may proxy such a registration of client device 110. Additionally, network agent 150 stores at least one monitoring program for download to client device 110, and, preferably during a registration process for client device 110, network agent 150 transmits an appropriate monitoring program to client device 110.

Network agent 150 also is capable of receiving data regarding applications executing on client device 110, and determine, from this data, that one or more applications executing on client device 110 are non-compatible with IMS infrastructure 160. Consequently, network agent 150 may use this data to select a translation logic in order to translate messages from a format compatible with an application executing on client device 110 to a format compatible with an application executing in IMS infrastructure 160, and vice versa. For example, network agent 150 may translate between a variation of SIP used by client device 110 and a different variation of SIP used by IMS infrastructure 160.

While network agent is depicted in network 100 as a single component, network agent 150 may comprise multiple physical or logical components. For example, network agent 150 may be deployed on a single device or on multiple devices. Furthermore, the logical functions of network agent 150 may be deployed on different devices. For example, the registration function of network agent 150, as described above, may be deployed on one or more devices, while the translation function of network agent 150, also described above, may be deployed on one or more separate devices.

d. IMS Infrastructure

IMS infrastructure 160 preferably contains services and applications that are access-network-independent. These services may facilitate traditional circuit-switched voice telephony, VoIP, PTT, multimedia calling and conferencing, audio or video streaming, gaming, or other audio, video, or multimedia applications.

IMS infrastructure 160 may comprise multiple logical components each with a distinct function. For example, the IMS infrastructure may include one or more of the following elements: call session control function (CSCF), signaling gateway (SGW), media gateway control function (MGCF), home subscriber server (HSS), as well as various application servers and/or downloadable application logic.

These IMS infrastructure elements, as well as any other IMS infrastructure elements not explicitly discussed here, may be combined together or separated into fewer or more logically distinct or physically distinct elements. For example, a single logical CSCF may include multiple physical devices. Alternatively, a CSCF and an SGW may share a common physical device.

Figure 2:
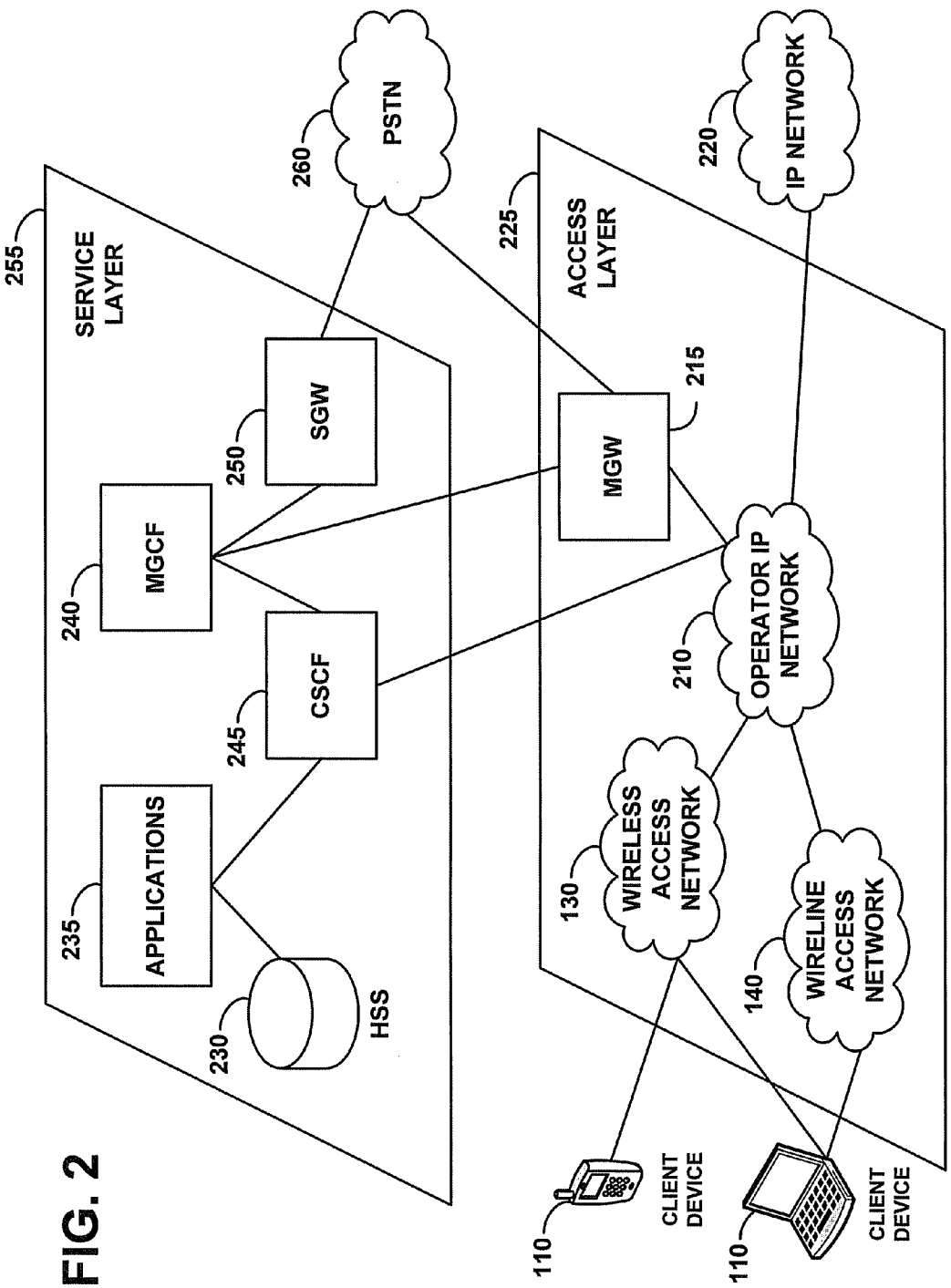
FIG. 2 is a block diagram of a communication network, including a communication infrastructure, in accordance with an exemplary embodiment.

FIG. 2 further illustrates the components of IMS infrastructure 160 in relation to an access network, such as a wireless or wireline access network. In FIG. 2, services layer 255 preferably includes HSS 230, MGCF 240, CSCF 245, SGW 250, and applications 235. Applications 235 may include application servers, services and/or logic, for IMS applications such as VoIP, PTT, presence, instant messaging, email, and so on. Access layer 225 comprises components that facilitate access to one or more types of access network. These components include, for example, wireless access network 130, wireline access network 140, operator IP network 210, and media gateway (MGW) 215. IMS infrastructure 160 preferably encompasses service layer 255, although some components of access layer 225, such as MGW 215, may also be considered to be part of IMS infrastructure 160.

Services layer 255 and access layer 225 are preferably communicatively linked. For example, in FIG. 2, CSCF 245 is communicatively linked to operator IP network 210, preferably using a session management protocol such as SIP. Similarly, MGW 215 and MGCF 240 are communicatively linked, preferably using a gateway control protocol, such as MEGACO or H.248. The division of service layer 255 and access layer 225 shown in FIG. 2 facilitates communications between client devices 110 and both IP network 220 and Publically Switched Telephone Network (PSTN) 260. Of course, the division between these layers may be made in other ways.

Though not shown in FIG. 2, network agent 150 may be categorized as part of either service layer 255 or access layer 225. Thus, network agent 150 may be considered to be part of IMS infrastructure 160, or may be considered to be part of an access network. Furthermore, service layer 255 or access layer 225 may include more or fewer components than shown in FIG. 2, and these components may be arranged differently. Additionally, the functions provided by the logical or physical components depicted in FIG. 2 are not limited to the description above, and may include functions deployed in or supported by present or future communication networks.

II. NETWORK AGENT OPERATION

This section describes exemplary network agent 150 operation. The descriptions, call flows, flow charts, methods, processes and diagrams referenced herein illustrate preferred embodiments of network agent 150 operation. However, network agent 150 operation is not limited to the descriptions herein and may include other functions and components.

a. Client Device Registration

Figure 3A:
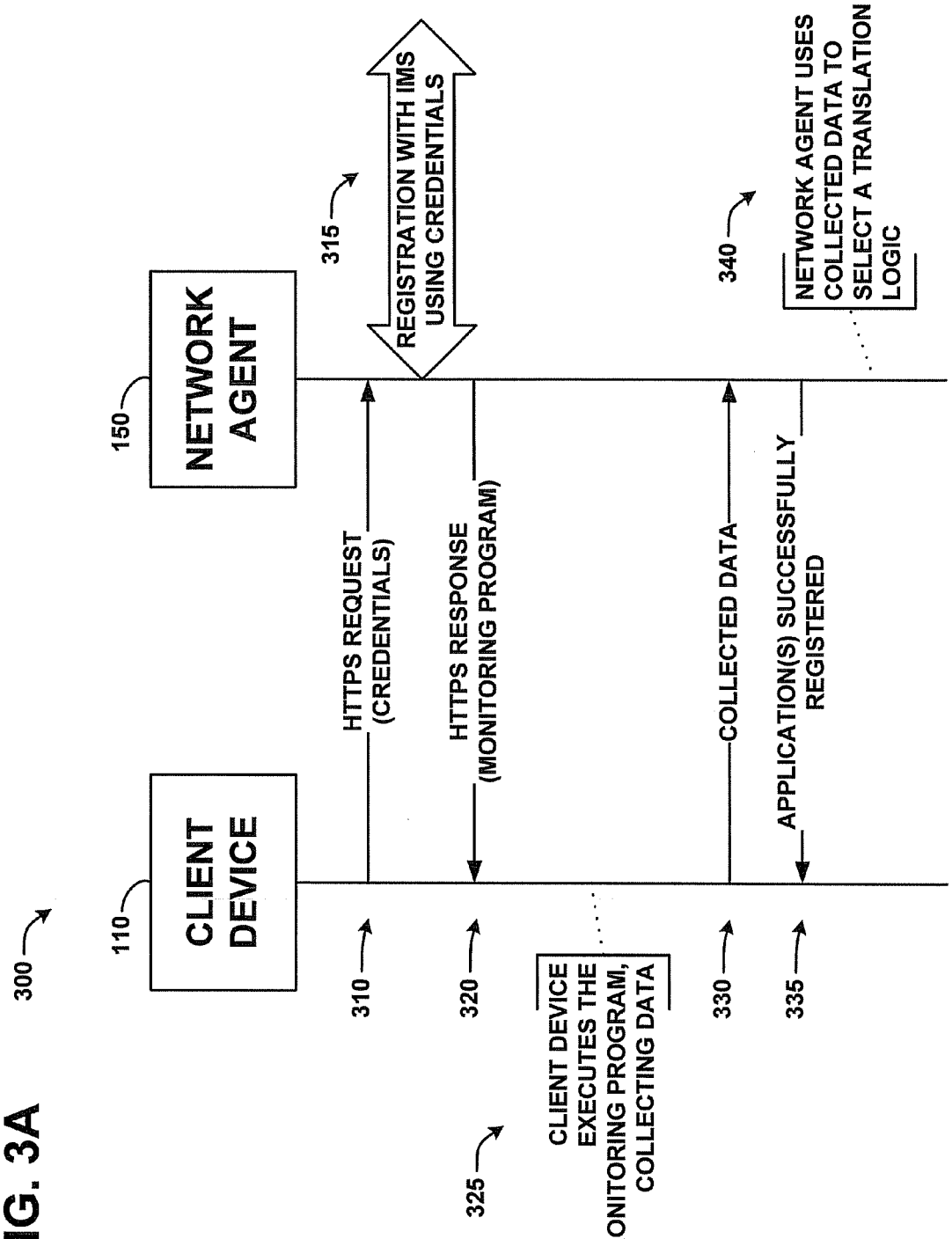
FIG. 3A depicts a call flow in accordance with an exemplary embodiment.

FIG. 3A depicts call flow 300, illustrating an exemplary registration of client device 110 with IMS infrastructure 160 (not shown), facilitated by network agent 150. At step 310, client device 110 transmits an HTTPS request containing credentials of either client device 110, a user, or both, to network agent 150. Client device 110 may register with network agent 150 because client device 110 is configured with network agent 150 as its default web proxy, or for other reasons.

At step 315, network agent 150 registers client device 110 with IMS infrastructure 160, using the credentials that network agent 150 received at step 310. This proxy registration is preferably accomplished through the use of SIP, and may include several steps, including (i) network agent 150 transmitting a SIP REGISTER message to IMS infrastructure 160, (ii) network agent 150 receiving an authentication challenge from IMS infrastructure 160, (iii) network agent 150 transmitting an authentication response to IMS infrastructure 160, and (iv) network agent receiving an indication of successful registration from IMS infrastructure 160. However this proxy registration process may comprise more or fewer messages, or different messages.

At step 320, network agent 150 transmits an HTTPS response message to client device 110, indicating successful registration and containing a monitoring program. However, instead of using HTTPS in steps 310 and 320, client device 110 and network agent 150 may use HTTP, or a different protocol.

Network agent 150 may store, or otherwise have access to, one or more monitoring programs. Each monitoring program is preferably designed for a specific client device operating system, client device model, or both. For example, if client device 110 is a MICROSOFT WINDOWS® laptop, then network agent 150 may transmit a monitoring program compatible with MICROSOFT WINDOWS® to client device 110. Similarly, if client device 110 is a LINUX® personal computer, then network agent 150 may transmit a monitoring program compatible with the variation of LINUX® executing on the personal computer.

Given the wide variety of operating systems and platforms used on wireless client devices, such as cell phones, network agent 150 may store dozens of different monitoring programs. These monitoring programs may support operating systems and platforms such as, but not limited to, WINDOWS MOBILE®, Java 2 Platform Micro Edition (J2ME®), BINARY RUNTIME ENVIRONMENT FOR WIRELESS® (BREW), PALM OS®, and BLACKBERRY® OS. Furthermore, different wireless client device manufacturers and families may exhibit different application programming interfaces (APIs), memory limits and user interface capabilities. Thus, different wireless client devices that support the same operating system or platform, such as J2ME®, may require different monitoring programs.

In order to determine the monitoring program to transmit to a particular client device, network agent 150 may use information supplied in the credentials transmitted to network agent 150 at step 310. Alternatively, network agent 150 may determine the monitoring program by looking up the client device's operating system and/or platform in a database, or network agent 150 may acquire this data during step 315 from IMS infrastructure 160.

Regardless of how the appropriate monitoring program is determined, client device receives the monitoring program and, at step 325, the client device 110 executes the monitoring program. This execution may be silent and in the background so that a user of client device 110 is not aware that the monitoring program is executing. On the other hand, the execution may be visible and apparent to a user of client device 110. Moreover, client device 110 may even prompt the user to authorize the execution of the monitoring program. Furthermore, the execution may occur within another program, such as a web browser, or the execution may be independent from other applications.

Once executing, the monitoring program queries client device 110 to determine communication applications that are executing on client device 110. To do so, the monitoring program may perform functions analogous to a "netstat" command, or a "ps" command, as supported by Microsoft Windows or UNIX command shells. In particular, these commands preferably retrieve data about each process executing on client device 110. The "netstat" command may also provide a list of transport layer ports being used by each process.

With this data, the monitoring program may further query client device 110 for more detail on each communication application. For example, some communication applications will report their versions by invoking the communication application from a command shell with a particular command line option. For example, a communication application named "sipphone" may report its version when invoked with a "sipphone–v" command line. The monitoring program may also use similar techniques to determine other data about a communication application.

Furthermore, the monitoring program may collect data on communication applications that are not executing on client device 110 at the time that the monitoring program is downloaded to client device 110. For instance, the monitoring program may examine a file system of client device 110 for one or more configuration files associated with communication applications. If the monitoring program finds such a configuration file, it may be able to determine the application name, application version, transport layer port numbers that the application will use, and/or other information from the configuration file.

A monitoring program may utilize some, all, or none of the techniques described above to collect data about communication applications. Alternatively, the monitoring program may utilize other techniques to collect this data. Furthermore, once downloaded to client device 110, the monitoring program may remain resident to client device 110, periodically transmitting data collected about communication applications executing on client device 110 to network agent 150. On the other hand, the monitoring program may be transmitted anew to client device 110 each time client device 110 registers with network agent 150. The monitoring program may also execute and collect data about communication applications executing on client device 110 each time that it is received by client device 110.

Regardless of how or when the data is collected, in step 330, client device 110 transmits the collected data to network agent 150. At step 335, network agent 150 transmits an indication that one or more of the communication applications on client device 110 for which data was collected are successfully registered.

At step 340, the network agent uses the collected data to select translation logic for at least one communication application executing on client device 110. The network agent may determine the appropriate translation logic to select from information local to itself or from information stored in other components, devices, or databases in network 100 or IMS infrastructure 160. For example, if one of the communication applications executing on client device 110 is a VoIP application that uses a variation of SIP that is non-compatible with the variation of SIP used by IMS infrastructure 160, network agent preferably determines how to translate SIP messages between the two variations of SIP. This determination may result in rules and/or program logic that manipulate the contents of SIP messages transmitted by client device 110 and IMS infrastructure 160. The rules and program logic may also denote that other parts of messages transmitted between client device 110 and IMS infrastructure 160 should be manipulated, such as transport layer port numbers or IP addresses.

Call flow 300 is illustrative in nature and may contain more or fewer steps than are shown in FIG. 3A. Furthermore, these steps may be performed in a different order than is depicted in FIG. 3A, and call flow 300 may be combined, whole or in part, with other call flows.

b. Translation Between IMS and Non-IMS Protocols

FIG. 3B, in call flow 350 depicts an exemplary set of message translations using translation logic that may have been selected during a process such as the one illustrated in FIG. 3A. At step 360, IMS infrastructure 160 transmits a SIP INVITE message to network agent 150. Generally speaking, a SIP INVITE message is used by a callee to initiate a VoIP, PTT, or multimedia session with one or more callers. Preferably a SIP INVITE message is the first part of a handshake between the caller and callee, and is followed by the callee transmitting a SIP 200 OK message to the caller and the caller transmitting a SIP ACK message to the callee. However, other SIP messages may be included in this handshake. The SIP INVITE message transmitted in step 360 is preferably IMS compatible and standardized, while client device 110 preferably executes a variation of SIP that is non-compatible with the IMS infrastructure.

This SIP INVITE message may have been originated on behalf of another client device or network entity that is attempting to establish a VoIP or PTT call with client device 110 via IMS infrastructure 160. IMS infrastructure 160 will direct this SIP INVITE message to network agent 150 because network agent 150 registered client device 110 with IMS infrastructure 160.

For purposes of this discussion, a "standardized" or "standard" protocol or application operates according to one or more specifications set forth by a standards organization, such as the IETF, or some other entity. Other entities that may standardize a protocol or application include a corporation, such as a telecommunications service provider, or a consortium of corporations. Thus, while a client device may be operating a protocol or application according to a standard, such as an RFC, the protocol or application may be non-compatible with protocols and applications as standardized in a communication infrastructure.

The SIP INVITE message in step 360 specifies a destination port 5060. Preferably this port is a transport layer port. For example, a Transmission Control Protocol (TCP) or User Datagram Protocol (UDP) application may listen to a particular transport layer port, designated by a number between 0 and $2^{16}-1$ for incoming messages. In the case of the SIP INVITE message in step 360, the destination port number is 5060, the standard port number for SIP, as specified by the Internet Assigned Numbers Authority (IRNA). However, other destination ports could be used.

The SIP INVITE message in step 360 also specifies SIP header A'. As is specified in RFC 3261, as well as other SIP-related RFCs, SIP messages are comprised of multiple headers, each header preferably containing information relevant to the SIP message. Examples of SIP headers include, but are not limited to "Via," "From," "To," "Call-ID," "CSeq," "Contact," and any other of the many SIP headers defined in RFC 3261 and other SIP-related RFCs. Some SIP headers are considered to be mandatory, and it is recommended that they appear in all SIP messages, while other SIP headers are considered to be optional, and they may or may not appear in any given SIP message.

Furthermore, some applications use variations of SIP that make use of or require SIP headers that are not supported, or only considered optional, by other applications using different variations of SIP. Additionally, some variations of SIP may use SIP headers in a particular way or with a particular set of parameters. Thus, two different SIP applications may be incompatible with one another even though both support SIP. For instance, a standalone VoIP client may use a different variation of SIP than IMS infrastructure 160. In order to overcome this deficiency so that the standalone VoIP client can communicate with IMS infrastructure 160, network agent 150 may use the translation logic selected during method 300 to translate between different variations of SIP.

In particular, at step 365, network agent 150 translates the SIP INVITE message from a variation of SIP compatible with IMS infrastructure 160 to a variation of SIP compatible with a communication application executing on client device 110. For example, instead of listening for SIP messages on standard SIP transport layer port 5060, the communication application may be listening for SIP messages on transport layer port 5160 instead. Thus, network agent 150 may translate the destination port number in the SIP INVITE from 5060 to 5160. Furthermore, the variation of SIP used by IMS infrastructure 160 may transmit SIP header A' in SIP INVITE messages, while the variation of SIP used by the communication application may instead expect to receive SIP header A, but not SIP header A', in SIP INVITE messages. Thus, network agent 150 may also translate SIP header A' to SIP header A.

In full generality, network agent 150 may translate one or more of any transport layer port numbers, IP addresses, SIP headers, SIP header parameters, and so on in any SIP message used in communication between client device 110 and IMS infrastructure 160. For purposes of this discussion, "translation" may also include adding SIP headers, or other parameters, to a SIP message, and/or removing SIP headers, or other parameters, from a SIP message. Additionally, for some or all SIP messages used in communication between client device 110 and IMS infrastructure 160, translation may not be required. Furthermore, network agent 150 may translate messages used in protocols other than SIP, such as H.323, the Real Time Streaming Protocol (RTSP), and so on.

Regardless of how translation occurs, at step 370, network agent 150 transmits a translated SIP INVITE message to client device 110. Preferably, this translated SIP INVITE message includes a destination transport layer port of 5160 and SIP header A. In response to receiving the translated SIP INVITE message, at step 375, client device transmits a SIP 200 OK message to network agent 150. Preferably, the SIP 200 OK message contains source transport layer port 5160 and SIP header B. (It is typical for IP applications to use the transport layer port number upon which they receive messages as a source transport layer port for responses to those messages. Thus for example, it is common, but not required, for an IP application to receive a message with a destination transport layer port of 5160, and respond using a message with a source transport layer port of 5160.) Also, it is preferable that SIP 200 OK message contains SIP header B.

At step 380, network agent 150 translates the SIP 200 OK message transmitted in step 375. In particular, network agent 150 translates the source transport layer port from 5160 to 5060. Furthermore, it is assumed that the communication application executing on client device 110 uses SIP header B in SIP 200 OK messages, while the IMS infrastructure 160 requires, or at least prefers, SIP header B' instead. Accordingly, network agent 150 translates SIP header B to SIP header B'. Further, it is desirable for this translation to occur according to the translation logic selected in method 300. Finally, at step 385, network agent 150 transmits the translated SIP 200 OK message to IMS infrastructure 160.

Call flow 350 is illustrative in nature and may contain more or fewer steps than are shown in FIG. 3B. Furthermore, these steps may be performed in a different order than is depicted in FIG. 3B, and call flow 350 may be combined, whole or in part, with other call flows, such as call flow 300.

Figure 4:
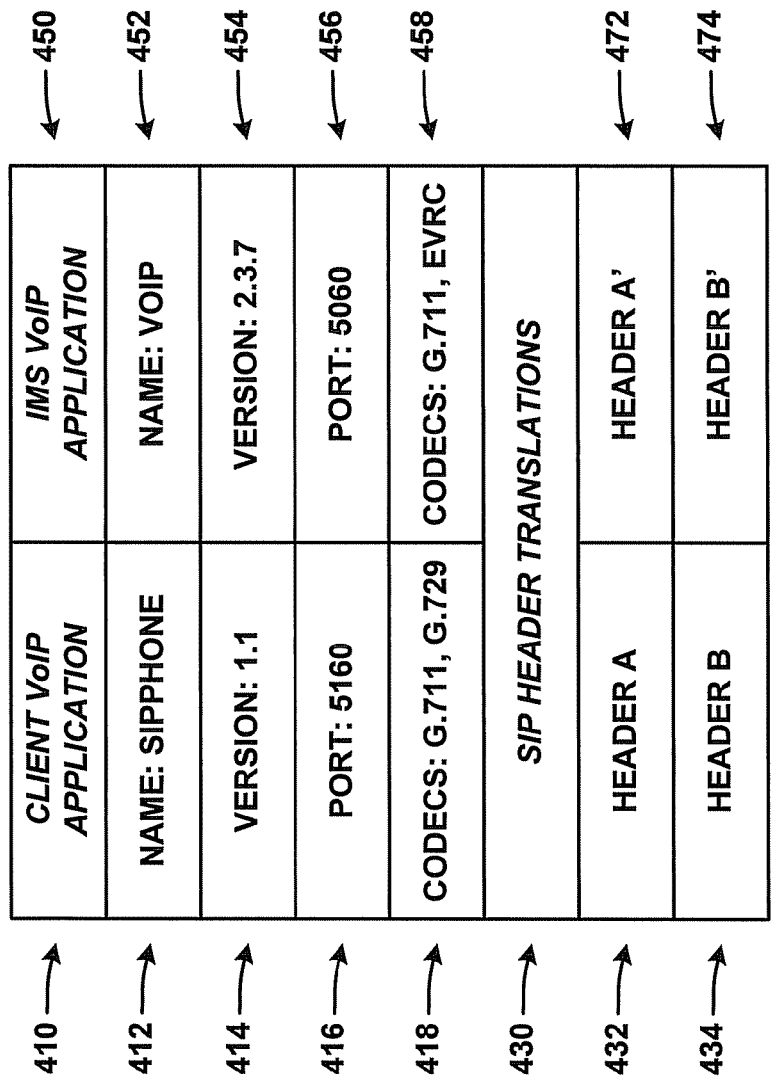
FIG. 4 depicts a mapping of application characteristics between two non-compatible applications in accordance with an exemplary embodiment.

In order to facilitate the translation of messages between communication applications executing on client 110 and standardized communication applications executing in IMS infrastructure 160, network agent 150 may maintain a translation table, such as translation table 400 illustrated in FIG. 4.

Translation table 400 preferably includes information about one or more communication applications executing on client 110 and associated standard communication applications executing in IMS infrastructure 160. This information preferably includes or refers to translation logic, or the information otherwise facilitates the translation of messages between two or more non-compatible applications. For example, the correlations and logic represented in translation table 400 may include references to other data, such as pointers to separately or remotely stored logic.

To illustrate this concept with an example, in translation table 400, client VoIP application 410 is mapped to IMS VoIP application 450. In particular, the name 412, version 414, transport layer port 416, and codec list 418, are provided for client VoIP application 410. Similarly, the name 452, version 454, transport layer port 456, and codec list 458, are provided for IMS VoIP application 450. Furthermore, translation table 400 preferably includes SIP header translations 430. For the example illustrated in translation table 400, SIP header A 432 from client VoIP application 410 would be translated to SIP header A' 472 for IMS VoIP application 450, and vice versa. Similarly, SIP header B 434 from client VoIP application 410 would be translated to SIP header B' 474 for IMS VoIP application 450, and vice versa.

Naturally, translation table 400 may contain more or fewer pieces of information about these applications, and more or fewer translation rules. Translation table 400 may also include program logic executable by network agent 150 to translate messages or headers from one variation of SIP to another. Furthermore, translation table 400 may include translation rules and logic for protocols other than SIP.

Translation table 400 is preferably stored within network agent 150 memory. However translation table 400 may be stored externally to network agent 150, for example in a separate database. Preferably, translation table 400 is instantiated at network agent 150 upon selection of translation logic in method 300, but it may be instantiated at network agent 150 at a different point in time.

III. METHODS OF OPERATION

The following methods illustrate operations according to exemplary embodiments. As these methods are merely exemplary, embodiments within the scope of this invention may contain more steps or fewer steps, and these steps may take place in a different order. Furthermore, the following methods may be combined with one another, in part or in whole.

FIG. 5 depicts a method 500 for enabling access to a communication infrastructure. At step 510, a monitoring program is transmitted from a network agent to a client device. The client device is preferably a wireless communication device. The monitoring program may be a standalone application or an applet designed to execute in a web browser. At step 515, the program is executed at the client device to collect data related to a given communication application executing on the client device. Preferably, the collected data includes the name, version, and transport layer port used by the given communication application, but more or less data may be collected. Alternatively or additionally, the monitoring program may query the client device to determine a list of executing processes at the client device.

At step 520, the collected data is transmitted to the network agent, and at step 525, the network agent uses the collected data to select a translation logic to translate between messages compatible with the given communication application and messages compatible with a standard communication application that is executing in the communication infrastructure. Preferably this communication infrastructure is an IMS infrastructure.

At step 530, the network agent applies the selected translation logic to a subsequent communication session between the given communication application and the standard communication application. Applying the selected translation logic may further comprise (i) translating a first message received from the given communication application to a format compatible with the at least one standardized communication application, (ii) transmitting the first message to the communication infrastructure, (iii) translating a second message received from the at least one standardized communication application to a format compatible with the given communication application, and (iv) transmitting the second message to the client device.

FIGS. 6A, 6B, and 6C depict a method 600, performed by a network agent such as network agent 150, for enabling access to a communication infrastructure. At step 605 the network agent receives a request from a client device, such as client device 110. The request may use, for example, HTTP, HTTPS, or some other protocol. At step 610, in response to the request, the network agent transmits a monitoring program to the client device. As discussed above, the network agent may have access to multiple monitoring programs and may determine the monitoring program to transmit to the client device based on the hardware or software configuration of the client device. The network agent transmits the monitoring program to the client device so that the client device can execute the monitoring program and thereby determine characteristics of the communication applications executing on the client device.

Accordingly, at step 615, the network agent receives, from the monitoring program, an indication of a first communication application executing on the client device. Preferably, the first communication application is non-compatible with one or more communication applications executing in the communication infrastructure. For example, the first communication application may use a variation of SIP, while the communication infrastructure uses a non-compatible, standardized variation of SIP to communicate.

The indication received by the network agent may comprise the first communication application's name, version, and/or transport layer port numbers used by the first communication application. Alternatively, the indication may comprise a list of processes executing on the client device.

At step 620, the network agent, in response to receiving the indication, selects a first translation logic to translate messages compatible with the first communication application to messages compatible with a standardized application executing in the communication infrastructure, and vice versa. At step 625, the network agent receives a first message from the first communication application, and, at step 630, the network agent uses the first translation logic to translate the first message to be compatible with a standardized communication application executing in the communication infrastructure. Then, at step 635, the network agent transmits the translated message to the standardized communication application.

Similarly, at step 640, the network agent receives a second message from the standardized communication application, and, at step 645, the network agent uses the first translation logic to translate the second message to be compatible with the first communication application. Then, at step 650, the network agent transmits the translated message to the first communication application.

However, the client device may be executing more applications than just the first communication application. Thus, at step 655, the network agent may receive, from the monitoring program executing on the client device, an indication of a second communication application executing on the client device. At step 660, the network agent, in response to receiving the indication, selects a second translation logic to translate messages compatible with the second communication application to messages compatible with a standardized application executing in the communication infrastructure, and vice versa.

Similar to the indication of the first communication application that the network agent received at step 615, the indication of the second communication application may comprise the second communication application's name, version, and/or transport layer port numbers used by the second communication application. Alternatively, this indication may comprise a list of processes executing on the client device. Additionally, steps 655 and 660, like all steps in method 600, may occur at a different point in method 600. For example, steps 655 and 660 may occur at the same time, or at about the same time as steps 615 and 620 respectively.

Regardless, at step 665, the network agent receives a third message from the second communication application, and, at step 670, the network agent uses the second translation logic to translate the third message to be compatible with a standardized application executing in the communication infrastructure. Then, at step 675, the network agent transmits the translated message to the standardized communication application. Although it is not shown in FIG. 6C, method 600 may also contain steps wherein the network agent receives messages from the communication infrastructure and translates the messages according to the second translation logic.

IV. EMBODIMENT OF A NETWORK AGENT

Figure 7:
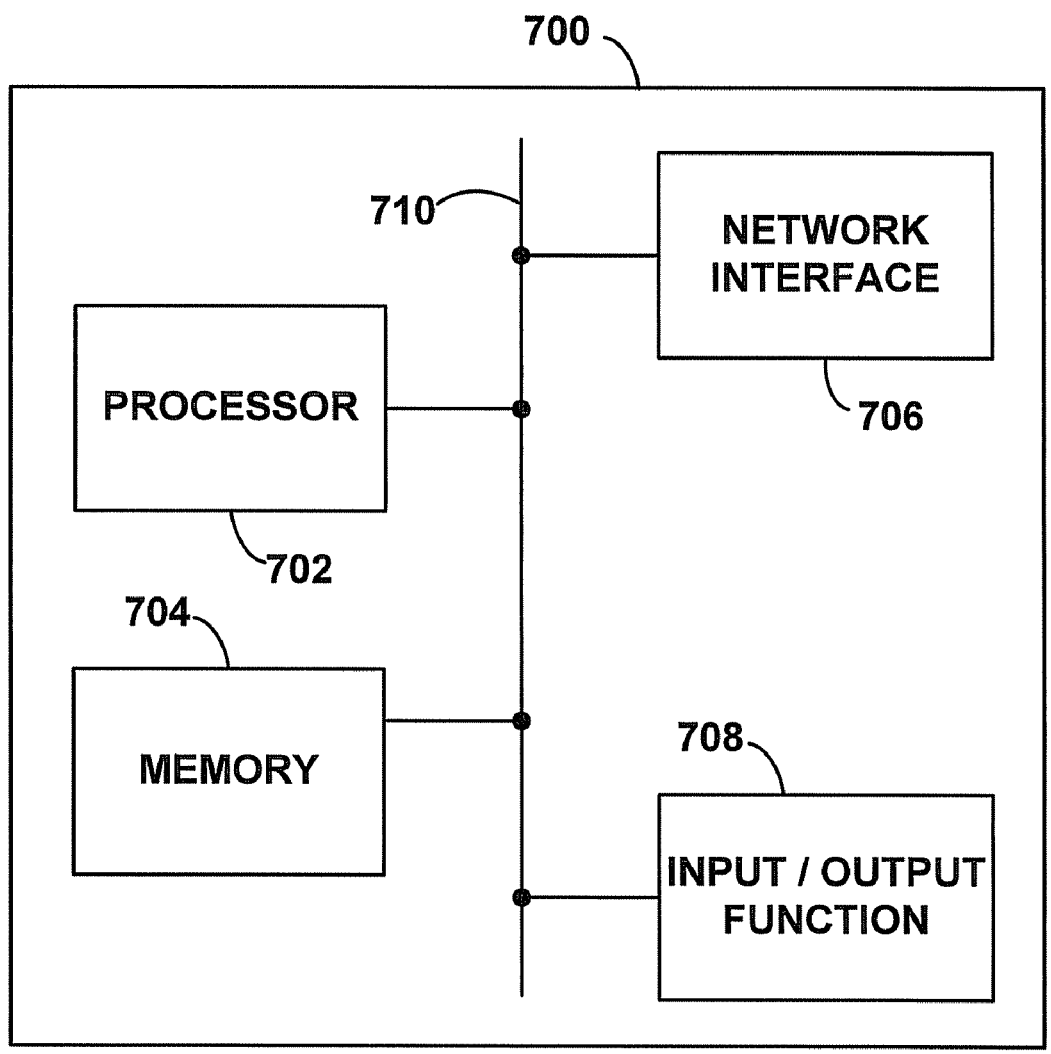
FIG. 7 is a block diagram of a network agent in accordance with an exemplary embodiment.

FIG. 7 is a simplified block diagram of an example network agent 700, illustrating some of the functional components that would likely be found in a network agent arranged to operate in accordance with the embodiments herein. Example network agent 700 could be a device in the IMS, or any other device that performs communication session establishment, management, or proxy functions. However, example network agent 700 can take other forms as well. Example network agent 700 preferably includes a processor 702, a memory 704, a network interface 706, and an input/output function 708, all of which may be coupled by a system bus 710 or a similar mechanism.

Processor 702 preferably includes one or more CPUs, such as one or more general purpose processors and/or one or more dedicated processors (e.g., application specific integrated circuits (ASICs) or digital signal processors (DSPs), etc.) Memory 704, in turn, may comprise volatile and/or non-volatile memory and can be integrated in whole or in part with processor 702. Memory 704 preferably holds program instructions executable by processor 702, and data that is manipulated by these instructions, to carry out various logic functions described herein. (Alternatively, the logic functions can be defined by hardware, firmware, and/or any combination of hardware, firmware and software.)

Network interface 706 may take the form of a wireline connection, such as an Ethernet, Token Ring, or T-carrier connection. Network interface 706 may also take the form of a wireless connection, such as IEEE 802.11 (Wifi), BLUETOOTH, or wide-are wireless connection. However, other forms of physical layer connections and other types of standard or proprietary communication protocols may be used over network interface 706.

Furthermore, network interface 706 may comprise multiple physical interfaces. If so arranged, some of these multiple physical interfaces may be used for communication with a client device, such as client device 110, while others may be used for communication with a communication infrastructure, such as IMS infrastructure 160. Alternatively, all of the physical interfaces may communicate with both a client device and an IMS infrastructure.

Input/output function 708 facilitates user interaction with example network agent 700. Input/output function 708 may comprise multiple types of input devices, such as a keyboard, a mouse, a touch screen, and so on. Similarly, input/output function 708 may comprise multiple types of output devices, such as a monitor, printer, or one or more light emitting diodes (LEDs). Additionally or alternatively, example network agent 700 may support remote access from another device, via network interface 706 or via another interface (not shown), such an RS-232 port.

By way of example, the data in memory 704 may comprise one or more monitoring programs for execution on one or more client devices. Furthermore, memory 704 may comprise translation logic to translate messages between communication protocols executing on client devices and standardized communication protocols executing in an IMS infrastructure. This translation logic may take a form similar to that of translation table 400, or may take a different form altogether. Memory 704 may further comprise stored program instructions that are executable by processor 702 to perform the methods and processes depicted in FIGS. 3A, 3B, 4, 5, 6A, 6B, and 6C. Memory 704 may further comprise stored program instructions that are executable by processor 702 to perform other methods and processes as well.

The data and program instructions stored in memory 704 described above are exemplary and not intended to be a complete description of the data and functions stored in memory 704, or of the data and functions supported by network agent 700. Network agent 700 may support other functions related to performing tasks associated with enabling IMS access for non-IMS applications, and these additional functions are preferably encoded as data and program instructions, and stored in memory 704.

V. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method for enabling access to an Internet Protocol Multimedia Subsystem (IMS) infrastructure, wherein the IMS infrastructure supports at least one standardized IMS application, wherein a client device is executing a client application that is non-compatible with the at least one standardized IMS application, and wherein a network agent is communicatively linked to the IMS infrastructure and the client device, the method comprising:

transmitting a monitoring program from the network agent to the client device;

the monitoring program collecting data related to the client application by querying the client device to determine a list of executing processes at the client device and identify the client application from at least one of the executing processes in the list, wherein the collected data comprises a name and a version of the client application;

the monitoring program transmitting at least the name and the version of the client application to the network agent;

the network agent using at least the name and the version of the client application to select a translation logic, wherein the network agent accesses a translation table that maps between (i) the name of the client application and the version of the client application and (ii) a name of the at least one standardized IMS application and a version of the at least one standardized IMS application, wherein the translation logic (i) translates first messages from the client application to translated first messages compatible with the at least one standardized IMS application, and (ii) translates second messages from the at least one standardized IMS application to translated second messages compatible with the client application; and the network agent applying the selected translation logic to subsequent communication sessions between the client application and the at least one standardized IMS application.

2. The method of claim 1, wherein the collecting data related to the client application comprises:

on the client device, the monitoring program using the name of the client application to determine the version of the client application.

3. The method of claim 1, wherein the applying the selected translation logic to the subsequent communication sessions comprises translating a first message received from the client application to a first format compatible with the at least one standardized IMS application, and transmitting the translated first message to the IMS infrastructure.

4. The method of claim 3, wherein the applying the selected translation logic to the subsequent communication sessions further comprises translating a second message received from the at least one standardized IMS application to a second format compatible with the client application, and transmitting the translated second message to the client device.

5. The method of claim 1,
wherein the translation table also maps between signaling protocol headers of the client application and signaling protocol headers of the at least one standardized IMS application.

6. At a network agent in communication with an Internet Protocol Multimedia Subsystem (IMS) infrastructure and a client device, wherein the IMS infrastructure supports at least one standardized IMS application, wherein the client device is executing a first client application that is non-compatible with the at least one standardized IMS application, a method comprising:

receiving a request from the client device;

transmitting to the client device a response to the request, the response including a monitoring program, wherein the monitoring program collects data related to the first client application by querying the client device to determine a list of executing processes at the client device and identify the client application from at least one of the executing processes in the list, wherein the collected data comprises a name and a version of the first client application;

receiving, from the monitoring program, the name and the version of the first client application executing at the client device;

at the network agent, using at least the name and the version of the first client application to select a first translation logic, wherein the network agent accesses a translation table that maps between (i) the name of the first client application and the version of the first client application and (ii) a name of the at least one standardized IMS application and a version of the at least one standardized IMS application;

in a subsequent first communication session between the first client application and the at least one standardized IMS application, wherein the at least one standardized IMS application is executing within the IMS infrastructure: (i) receiving a first message from the client device, wherein the first message was transmitted by the first client application, (ii) using the first translation logic to translate the first message to be compatible with the at least one standardized IMS application, (iii) transmitting the translated first message to the at least one standardized IMS application;

(iv) receiving a second message from the at least one standardized IMS application, (v) using the first translation logic to translate the second message to be compatible with the first client application, and (vi) transmitting the translated second message to the client device for reception by the first client application.

7. The method of claim 6, further comprising:

receiving, from the monitoring program, a second name and a second version of a second client application executing at the client device, wherein the second client application is non-compatible with the at least one standardized IMS application;

in response to receiving the second name and the second version of the second client application, selecting a second translation logic; and in a subsequent second communication session between the second client application and the at least one standardized IMS application, wherein the at least one standardized IMS application is executing within the IMS infrastructure: (i) receiving a third message from the client device, wherein the third message was transmitted by the second client application, (ii) using the second translation logic to translate the third message to be compatible with the at least one standardized IMS application, and (iii) transmitting the translated third message to the at least one standardized IMS application.

8. The method of claim 6, wherein the client device is a wireless communication device.

9. The method of claim 6, wherein the first client application uses a variation of Session Initiation Protocol (SIP), and the at least one standardized IMS application uses a different variation of SIP, and wherein the translating the first message to be compatible with the at least one standardized IMS application comprises translating the first message to be compatible with the different variation of SIP used by the at least one standardized IMS application.

10. The method of claim 6, wherein the request from the client device comprises a hypertext transport protocol over secure sockets layer (HTTPS) request, the response comprises an HTTPS response, and the monitoring program included in the HTTPS response comprises an applet.

11. A system comprising:

an Internet Protocol Multimedia Subsystem (IMS) infrastructure supporting at least one standardized IMS application;

a client device executing a client application, wherein the client application is non-compatible with the at least one standardized IMS application; and a network agent communicatively linked to the IMS infrastructure and the client device, wherein the network agent comprises a central processing unit (CPU) and a memory, wherein the memory contains:

a monitoring program;

program logic executable by the CPU to transmit the monitoring program to the client device, the monitoring program collecting data related to the client application by querying the client device to determine a list of executing processes at the client device and identify the client application from at least one of the executing processes in the list, wherein the collected data comprises a name and a version of the client application;

program logic executable by the CPU to receive, from the monitoring program executing on the client device, the name and the version of the client application;

program logic executable by the CPU to select a translation logic based at least the name and the version of the client application, wherein the network agent accesses a translation table that maps between (i) the name of the client application and the version of the client application and (ii) a name of the at least one standardized IMS application and a version of the at least one standardized IMS application;

program logic executable by the CPU to, based on the selected translation logic, translate first messages received from the client application to translated first messages compatible with the at least one standardized IMS application;

program logic executable by the CPU to, based on the selected translation logic, translate second messages received from the at least one standardized IMS application to translated second messages compatible with the client application; and program logic executable by the CPU to apply the selected translation logic to subsequent communication sessions between the client application and the at least one standardized IMS application.

12. The system of claim 11, wherein the at least one standardized IMS application uses a first variation of Session Initiation Protocol (SIP).

13. The system of claim 12, wherein the client application executing on the client device uses a second variation of SIP.

14. The system of claim 11, wherein the program logic executable by the CPU to transmit the monitoring program to the client device transmits the monitoring program during a hypertext transport protocol over secure sockets layer (HTTPS) transaction between the client device and the network agent.

15. The system of claim 11, wherein the client device is a wireless communication device.

* * * * *